United States Patent [19]

Curchod

[11] 4,404,851
[45] Sep. 20, 1983

[54] BASE ASSEMBLY FOR WHEEL BALANCING MACHINE

[76] Inventor: Donald B. Curchod, 23555 Mt. Eden Rd., Saratoga, Calif. 95070

[21] Appl. No.: 266,792

[22] Filed: May 26, 1981

[51] Int. Cl.³ .................. G01M 1/02; G01M 1/16
[52] U.S. Cl. .................................. 73/460; 73/487
[58] Field of Search ............. 73/460, 471, 487, 66; 248/678, 679, 680, 346, DIG. 10

[56] References Cited

U.S. PATENT DOCUMENTS 3,361,399  1/1968  Hestand et al. ............... 248/679
4,173,146 11/1979  Kogler et al. .................. 73/462

Primary Examiner—James J. Gill
Attorney, Agent, or Firm—Flehr, Hohbach, Test, Albritton & Herbert

[57] ABSTRACT

A relatively lightweight base assembly for a dynamic wheel balancing machine is stabilized by filling a pliant plastic bag carried by the base assembly with a sufficient volume of pourable material, such as water, to provide a free form body of ballast. Also, a plurality of bags of a type to receive pourable sand can be filled with sand, as desired, for supplying ballast and for damping machine movements.

5 Claims, 5 Drawing Figures

U.S. Patent  Sep. 20, 1983  Sheet 1 of 2  4,404,851
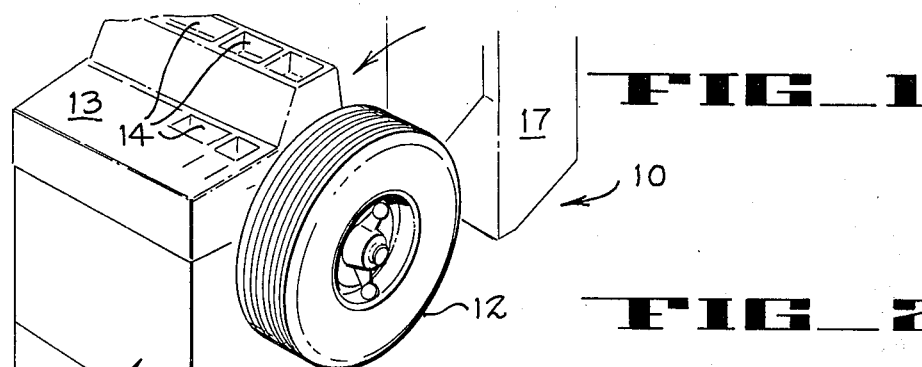
FIG_1
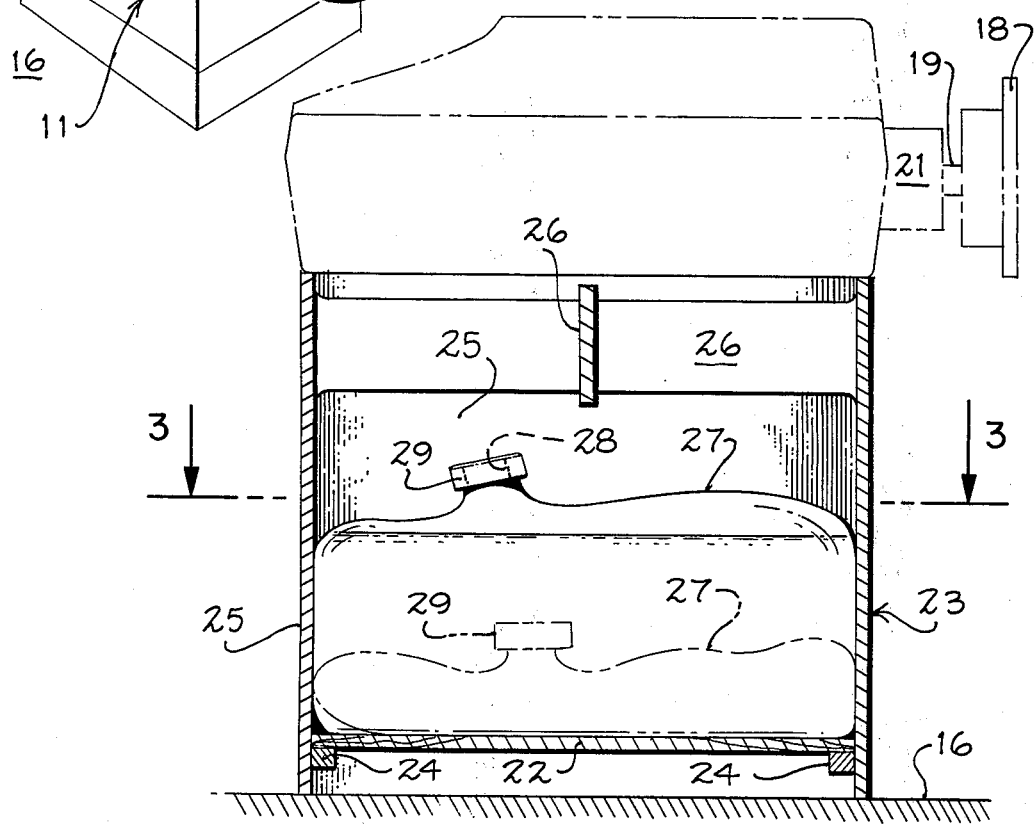
FIG_2
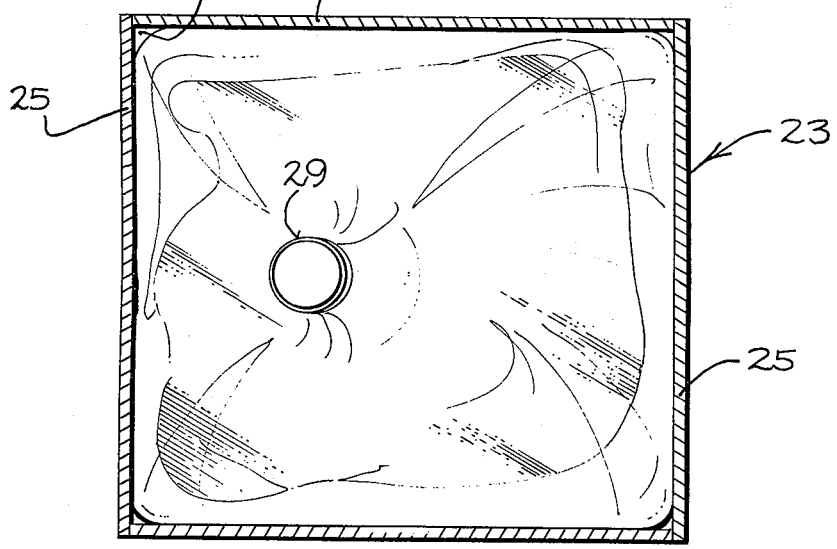
FIG_3

U.S. Patent  Sep. 20, 1983  Sheet 2 of 2  4,404,851
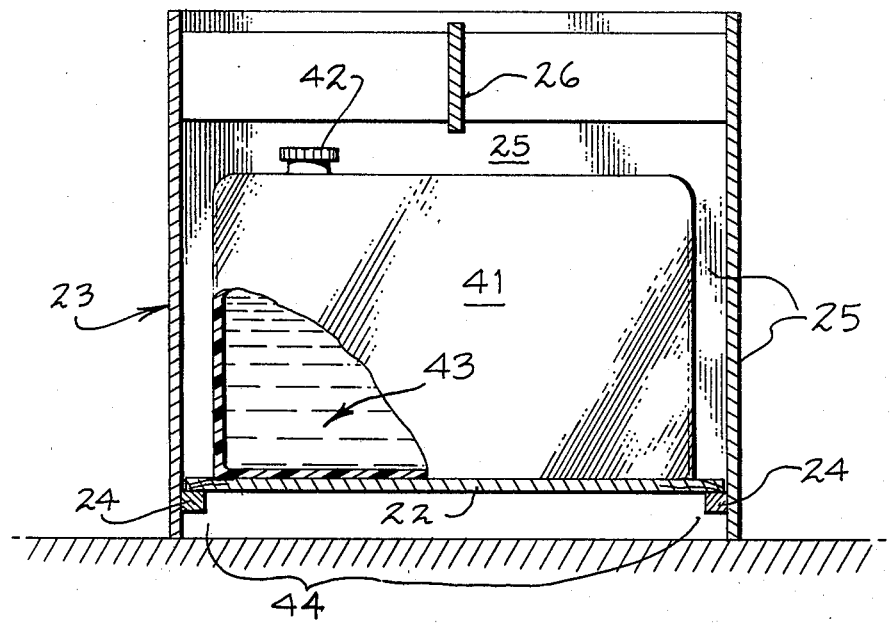
FIG_4
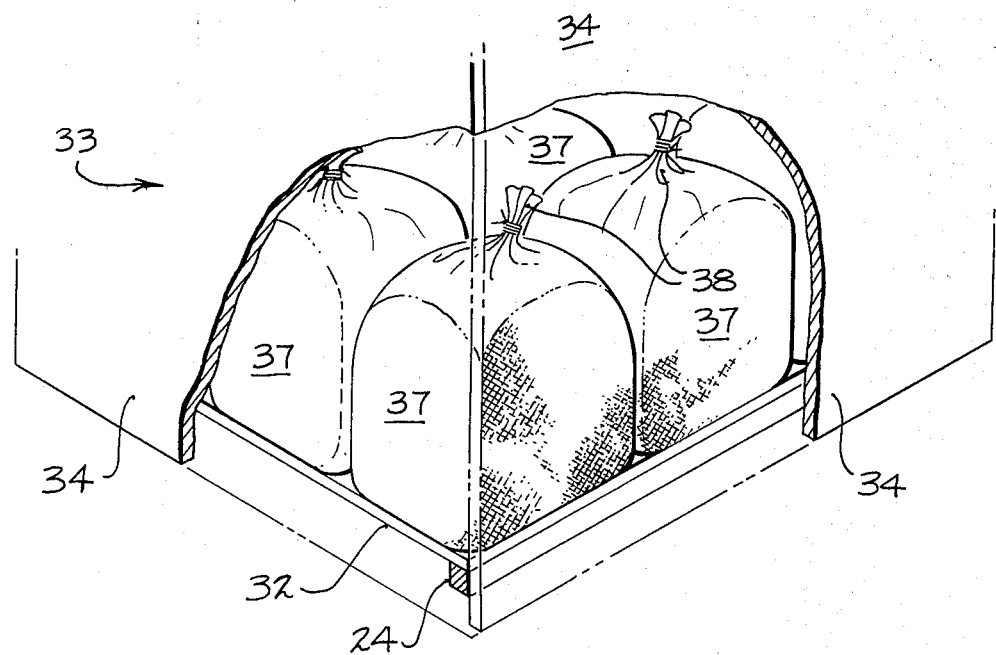
FIG_5

BASE ASSEMBLY FOR WHEEL BALANCING MACHINE

This invention pertains to a base assembly for a wheel balancing machine and more particularly to such a mounting base characterized by container means for receiving fluid material therein to provide suitable ballast to the base.

In the construction of wheel balancing machines of a type wherein a wheel and tire assembly are mounted upon a shaft and rotated with the shaft for determining the location and amount of weight to be applied to the wheel, it has been necessary to support such rotating wheel and tire assemblies on a relatively heavy base assembly.

In one instance the base assembly has been constructed as a hollow body of poured concrete. However, it has been observed that the shipping costs attributed to the transportation of such a relatively heavy base causes the machine to be overly expensive or to significantly reduce the manufacturer's profit per machine.

As disclosed herein a base assembly is provided whereby this additional weight can be supplied simply by adding ballast at the destination whereby the weight does not need to be shipped.

In general, according to the invention, there is provided a support base assembly comprised of upstanding rigid wall portions of relatively light weight material arranged to form an enclosed body for supporting a wheel balancing assembly at an appropriate working height above a support surface. A floor panel disposed within and adjacent the bottom end of the base is adapted to support a container of fluid ballast disposed to rest freely thereon for stabilizing the base assembly for damping movements imparted to the base during rotation of an unbalanced wheel and tire assembly.

In general, it is an object of the present invention to provide an improved support base assembly for a wheel balancing machine permitting substantial reduction in the weight required to be shipped by the manufacturer to a customer.

Another object of the invention is to provide such a support base characterized by a readily fillable and sealable container for receiving fluid material therein to provide ballast to the base as the container lies upon a floor panel in a free form state.

The foregoing and other objects of the present invention will be more particularly disclosed in the following detailed description of preferred embodiments of the invention when considered in conjunction with the drawings, in which:

FIG. 1 shows a diagrammatic perspective view of a dynamic wheel balancing machine incorporating the invention;

FIG. 2 shows a diagrammatic front elevation section view of the support base assembly of the machine of FIG. 1 according to the invention;

FIG. 3 shows a diagrammatic plan view, in section, of another embodiment of the support base assembly of FIG. 2 taken along the line 3—3 thereof; and FIG. 4 shows a diagrammatic elevation section of a support base according to another embodiment of the invention.

FIG. 5 shows a diagrammatic perspective view of a corner of a support base in enlarged detail, according to another embodiment of the invention.

In general, as shown in FIG. 1, a dynamic wheel balancing machine 10 of a type suitable for employing the present invention includes a support base assembly 11. Assembly 11 supports means for rotating a wheel and tire assembly 12 and further includes means (not shown) for detecting and measuring imbalance forces acting upon the wheel and tire assembly while it rotates. The top 13 of machine 10 includes a number of pockets or cavities 14 for storing wheel weights (not shown) to be added to the rim of the wheel. Base assembly 11 is of a sufficient height to dispose the foregoing construction at an appropriate working height above a support surface, such as the floor 16. Finally, prior to rotating the wheel and tire assembly 12 a protective hood 17 is pivotally moved downwardly over the top portion of the wheel and tire assembly 12.

As shown in FIG. 2 a mounting hub having a flange 18 disposed on the end of a rotatable axle 19 mounted in the bearing housing 21 rotates under the operation of a drive motor (not shown).

Base assembly 11 is formed as an enclosed body 23 for supporting the foregoing construction. The enclosure formed by base assembly 11 includes upstanding rigid wall portions of relatively light weight material welded along the common edges thereof.

A relatively light weight and readily removable floor panel 22 of suitable material, such as plywood, is disposed within and adjacent the bottom end of the enclosed body 23. A pair of spaced apart parallel elongate elements 24, welded to confronting side walls of body 23 supports panel 22 in the foregoing position.

A pair of mutually perpendicular cross braces 26, each disposed to extend between a pair of confronting walls of body 23, serves to provide sufficient rigidity while employing relatively light weight material for body 23.

Floor panel 22 supports a container for fluid ballast disposed to rest freely thereon for stabilizing base 11 and for damping movements imparted to base assembly 11 during rotation of an unbalanced wheel and tire assembly 12.

As shown in FIG. 2 the pliant plastic bag 27 having a sealable flow passage 28 sealed by means of a suitable cap 29 typically is shipped empty with the rest of the machine. However, upon arrival at its destination cap 29 can be removed and bag 27 then filled with suitable fluid such as water or in some cases sand so as to provide an appropriate ballast to base assembly 11.

It has been observed that the nature of this type of ballast, wherein a body of fluid material lies as a free form body provides improved damping for movements imparted to base assembly 11 during rotation of wheel and tire assembly 12.

As shown it has been observed that by providing a container of ballast in a free form state to a machine of the type described, the damping is achieved with application of lesser weight to base assembly 11 than was heretofore believed sufficient.

Accordingly, as described above, there has been provided an improved base assembly for a wheel balancing machine wherein the weight of the base assembly is significantly reduced for shipping while at the same time providing means for relatively easily adding the weight at the destination in a manner providing improved damping and stabilizing of the assembly.

According to another embodiment, as shown in FIG. 3, the body 33 comprises four upstanding rigid side panels 34 strengthened by mutually perpendicular cross braces (not shown). A floor panel 32 supports a plurality of four sand bags 37 tied off at 38.

It will be readily evident that it would not be necessary to ship the weight of the sand along with the remaining portion of the machine. Accordingly, by that difference of weight a substantial saving in transportation costs has been effected.

Yet another embodiment is shown in FIG. 4 in which a semirigid plastic container 41 is dimensioned to pass through a bottom opening 44 in body 23 prior to placement of the readily removable floor panel 22.

After being disposed upon panel 22, container 41 can be filled with liquid, such as water 43, via a sealable flow passage closed by the cap 42.

As described with regard to the embodiment shown in FIG. 2, a pair of cross-braces 26 serve to provide rigidity to the relatively light weight base construction while each of a pair of elongate elements 24, secured to the sidewalls 23, forms an elongate ledge for supporting the readily removable floor panel 22.

Thus, the relatively light weight container 41 can be disposed within body 23 and thereafter filled simply by means of a hose or other suitable source of water.

From the foregoing it will be readily evident that there has been provided a relatively simple and inexpensive means for providing ballast to a dynamic wheel balancing machine in a manner minimizing shipping costs for the machine.

I claim:

1. In a balancing machine of a type having means for supporting a body for rotation and having means for detecting and measuring imbalance forces acting upon the body, a support base comprising upstanding rigid walls of relatively light weight material forming the sides thereof for supporting the first and second named means at an appropriate working height above a support surface, an opening extending through an end of the base, a bottom closure panel disposed within and adjacent the bottom end of said base, and readily removable means resting freely thereon and independently thereof for containing ballast material in fluid form for stabilizing said support base and for damping movement imparted thereto by rotation of said body.

2. In a balancing machine according to claim 1 in which the last named means comprises a pliant bag, said bag including an opening for filling and draining said ballast material into and out of same, and means forming a closure for sealing said opening to permit the bag and its contents to spread laterally across said panel substantially uniformly to provide a uniformly distributed ballast thereon.

3. In a dynamic wheel balancing machine according to claim 1 in which the last named means comprises a pliant bag having a sealable opening for filling and draining the bag, said bag and contents when sealed serving to provide a free form body of fluid material resting unattached upon said floor panel for stabilizing said support base and damping movements thereof.

4. In a dynamic wheel balancing machine of a type having means for rotating a wheel and tire assembly and having means for detecting and measuring imbalance forces acting upon said assembly while rotating same, a support base comprising upstanding rigid confronting walls of relatively light weight material forming the sides thereof for supporting the first and second named means at an appropriate working height above a support surface, an access opening defined through an end of said base, a readily removable floor panel forming a closure for said opening adjacent the bottom end of said body, another opening at the upper end of said body serving to permit a pliant container to be passed through the last named opening to be disposed to rest upon said panel, said container being adapted to hold material in fluid form therein for stabilizing said base.

5. In a dynamic wheel balancing machine of a type having means for rotating a wheel and tire assembly and having means for detecting and measuring imbalance forces acting upon the wheel and tire assembly during rotation of same, a support base comprising relatively light weight, upstanding rigid wall portions forming an enclosed body for supporting the first and second named means at an appropriate working height above a support surface, means forming a floor panel disposed adjacent the bottom end of said body and serving to close a bottom opening in said base, and a sealable, inflatable container adapted to be disposed upon said floor panel, said container being adapted to be inflated by and to hold ballast in fluid form for stabilizing said support base and for damping movement imparted to said base during rotation of an unbalanced wheel and tire assembly.

* * * * *